July 6, 1937. J. H. VAN UUM 2,086,288
SPRING CLIP
Filed Jan. 30, 1936

INVENTOR.
JOHN H. VAN UUM
BY
ATTORNEY.

Patented July 6, 1937

2,086,288

UNITED STATES PATENT OFFICE 2,086,288

SPRING CLIP

John H. Van Uum, Lakewood, Ohio

Application January 30, 1936, Serial No. 61,509

2 Claims. (Cl. 189—88)

This invention relates to retainer clips for securing channel bead trim to automobile bodies, fenders, metal furniture, refrigerator cabinets, sheet steel walls and the like, and has for its object the provision of a simple, efficient retainer clip capable of being cheaply manufactured and particularly adapted for use with certain forms of channel having inturned flanges and desired to be very rigidly retained in position.

A further object is to so form the retaining member that it may fit the interior of the retainer clip and have sufficient length to prevent likelihood of its damaging the channel member when the clip is in the channel and is driven through its opening in the support. To this end, the retainer clip is made with a wider than usual strip and is fitted into narrow, slot-like openings in the support.

Other objects include economy of manufacture and efficiency in assembly. Still other objects will become apparent from the following description which relates to the accompanying drawing, in which:—

Figure 1:
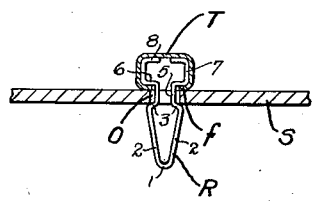
Fig. 1 is a section through a support and channel member showing my retainer clip in position.

Referring to the drawing by the use of reference characters, T indicates a channel of the now widely used substantially rectangular form having spaced in-turned flanges *f* adapted to fit against the support S, which may be any suitable metal member, as the panel or fender of an automobile or steel wall panel of any character.

The support S is provided with spaced-apart openings *o*, shown elongated and in the nature of slots with substantially parallel sides.

The retaining clip member is designated generally R and comprises a strip of spring metal of substantially uniform width, preferably considerably wider than the usual clip, such, for example, as shown in my co-pending application Serial No. 61,510, filed January 30, 1936. The strip is bent as at 1 intermediate its ends, and then extends into substantially straight leg portions 2, upwardly diverging somewhat, and at 3 abruptly turning inwardly to form a locking shoulder at the free end of each leg and adapted to engage beneath the support at the slot-like openings. The strip continues in preferably substantially parallel neck portions at 5 and then is bent outwardly as at 6, upwardly as at 7, and again inwardly as at 8, forming a substantially boss-like head.

It will be seen that the head portions 6, 7 and 8 are of a shape to be complementary to the interior of the channel T, as shown in Fig. 1, while the portions 5 extend past the flanges and through the opening, and the shoulders 3 may engage beneath the strip S. The ends of the strip as at 8 are normally spaced slightly apart to permit the contraction of the retainer as the shoulders pass through the opening *o*.

The abruptness of the shoulders and the width which lends considerable spring pressure effects a very firm gripping action beneath the support and tends constantly to pull the channel trim toward the support when in position. The gripping action is so effective that this bead trim may be made straight and bent around the curves of an automobile body or fender and gripped in position as it is bent by pressing the retainer clips into their respective openings, and the retaining or holding strength is sufficient to not only firmly hold the channel trim member against inadvertent movement, but to prevent its removal, except by the physical contraction or compression of the clip from the opposite side of the supporting member.

Such strip is often tampered with and sometimes removed and stolen, but this form of clip is an effective deterrent to that practice.

The length of the clip in the channel, that is, longitudinally of the channel, is such that even though considerable force is required to cause the retainer to enter the openings *o*, this may be done by any soft hammer, such as a rubber mallet, striking on the top of the channel without likelihood of deadening or distorting the channel, and because of the close fit of the head members of the retainer inside, the very abrupt shoulders 3 may pass fully through and engage beneath the support S with a single pressure movement or blow, as described.

Figure 2:
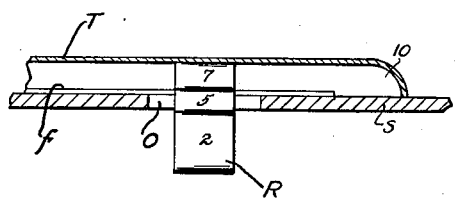
Fig. 2 is a longitudinal section of the same, showing the retainer clip in elevation.
Figure 3:
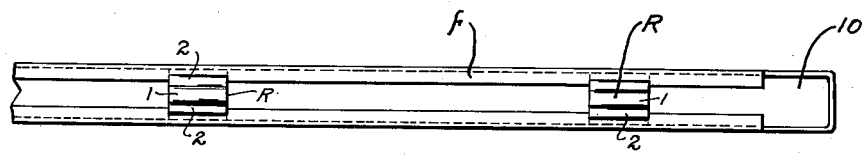
Fig. 3 is a bottom plan of the strip with a plurality of retainer clips in position.
Figure 4:
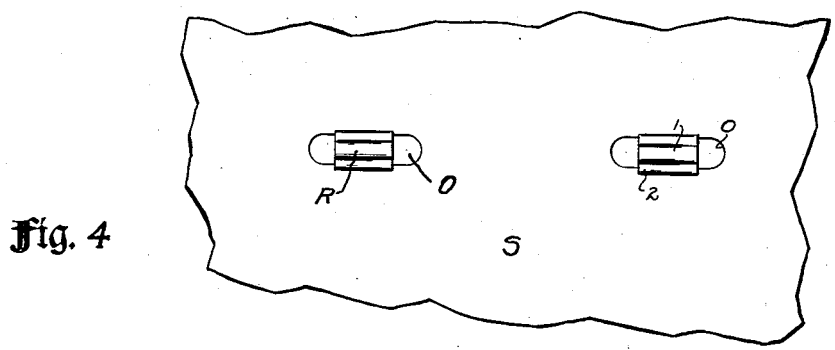
Fig. 4 shows the support with two retainer clips in position without the channel.
Figure 5:
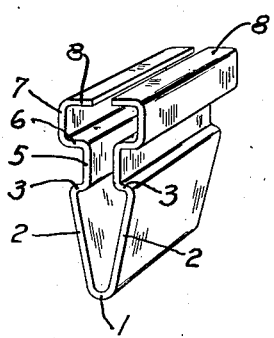
Fig. 5 is an enlarged perspective view of the retaining member.

It will be seen from the foregoing that I have provided a clip capable of holding with great strength and yet capable of great convenience of assembly, and economical to manufacture. The assembly of the clips with the channel may be accomplished at an opening 10 in the end of the channel, the flanges *f* stopping short of the end, as shown in Figs. 2 and 3. Obviously, the channel may be cut away at other points to permit assembly of the clips on a long strip of channel trim.

It is to be understood that the specification and claims are intended to also cover the subject matter of the device illustrated in Figs. 1 to 4 inclusive and 11 to 15 inclusive, of my copending application Serial No. 61,510 filed on January 30, 1936, and which claims were divided out of the original application.

Having thus described my invention, what I claim is:

1. The combination with a channel member having a rectangular shaped interior and inturned flanges and a supporting member having spaced apertures therein, of a securing device formed of a single uniform width strip of spring metal and having a portion intermediate its ends in the form of divergent leg portions and being receivable connected end foremost through one of said apertures by flexure of the shank portion, said device having intermediate portions at the free ends of the leg portions in the form of locking shoulders engageable beneath the openings in said supporting member upon reflexure of the shank portion and having neck portions extending from the locking shoulders and receivable between the flanges and in the associated one of the apertures, and separated head portions extending from the neck portions outwardly, and then upwardly, and then inwardly, and having an external contour complementary to the internal contour of the rectangular shaped channel member, and said head portions being yieldably receivable in the channel member to secure the channel member to said support with constant tension.

2. In a combination including an apertured support, a channel member to be secured thereto and having inturning flanges, and a securing device for securing the member to the support, said device comprising a strip of spring metal having a portion intermediate its ends in the form of connected leg portions divergent from their point of connection and defining a shank portion and receivable connected end foremost through one of said apertures of the support by flexure of the shank portion, and having intermediate portions at the free ends of the leg portions in the form of locking shoulders which are engageable beneath the support adjacent the aperture upon reflexure of the shank portion, said strip of metal neck portions extending from said locking shoulders and receivable between the flanges and in the said aperture, the portions of the said strip beyond the neck portion extending in the form of separated head portions complementary in contour to and snugly fitting the interior of the channel member and flanges with yielding pressure for securing the channel member firmly to the supporting member in firm juxtaposition.

JOHN H. VAN UUM.